(12) United States Patent
McFarlane et al.

(10) Patent No.: US 9,195,760 B2
(45) Date of Patent: *Nov. 24, 2015

(54) METHODS AND SYSTEMS FOR DYNAMICALLY SUGGESTING ANSWERS TO QUESTIONS SUBMITTED TO A PORTAL OF AN ONLINE SERVICE

(71) Applicant: SALESFORCE.COM, INC., San Francisco, CA (US)

(72) Inventors: Patrick McFarlane, San Francisco, CA (US); Ganesh Mathrubootham, Fremont, CA (US); Shuchun Yang, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/066,107

(22) Filed: Oct. 29, 2013

(65) Prior Publication Data

US 2014/0059057 A1 Feb. 27, 2014

Related U.S. Application Data

(63) Continuation of application No. 13/111,195, filed on May 19, 2011, now Pat. No. 8,595,207.

(60) Provisional application No. 61/354,604, filed on Jun. 14, 2010.

(51) Int. Cl.
*G06F 17/30* (2006.01)

(52) U.S. Cl.
CPC ...... *G06F 17/30867* (2013.01); *G06F 17/3053* (2013.01); *G06F 17/30864* (2013.01)

(58) Field of Classification Search
CPC .......... G06F 17/3097; G06F 17/30973; G06F 17/30967; G06F 17/30976; G06F 17/3064; G06F 17/30646
USPC .................................. 707/765, 766, 767, 768
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

OTHER PUBLICATIONS

Non-Final Office Action from U.S. Appl. No. 13/874,420, dated Sep. 25, 2014.

(Continued)

*Primary Examiner* — Vincent F Boccio
(74) *Attorney, Agent, or Firm* — Zilka-Kotab. PC

(57) ABSTRACT

In accordance with embodiments, there are provided mechanisms and methods for dynamically suggesting answers to questions submitted to a portal of an online service. These mechanisms and methods for dynamically suggesting answers to questions submitted to a portal of an online service can enable embodiments to provide help document suggestions with limited user input. The ability of embodiments to provide help document search term suggestions with limited user input can enable users to quickly and efficiently find useful help documents.

26 Claims, 10 Drawing Sheets

Suggestion Score Calculator 400

| Factors → | Occurrences | Top | Average | Range | # of Words |
|---|---|---|---|---|---|
| Example Values | 4 | 85 | 75 | 20 | 3 |
| Maximums | 100 | 100 | 100 | 100 | 3 |
| Normalized Values | 0.04 | 0.85 | 0.75 | 0.8 | 1 |
| Weights | 0.1 | 0.2 | 0.3 | 0.3 | 0.1 |
| Weighted Values | 0.004 | 0.17 | 0.225 | 0.24 | 0.1 |
| Percentage of Score | 0.54 | 23.0 | 30.45 | 32.48 | 0.1 |

| Total Raw Score | 0.739 | Friendly Factor | 100 | Final Suggested Score | 73.9 |
|---|---|---|---|---|---|

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,006,225 A | 12/1999 | Bowman et al. |
| 6,092,083 A | 7/2000 | Brodersen et al. |
| 6,144,958 A | 11/2000 | Ortega et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,039 B2 | 8/2010 | Weissman et al. |
| 7,844,599 B2 * | 11/2010 | Kasperski et al. ............ 707/713 |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,407,231 B2 * | 3/2013 | Acharya et al. ............... 707/723 |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0071741 A1 * | 3/2005 | Acharya et al. ............... 715/500 |
| 2005/0091098 A1 | 4/2005 | Brodersen et al. |
| 2005/0223022 A1 | 10/2005 | Weissman et al. |
| 2005/0234953 A1 * | 10/2005 | Zhang et al. ................. 707/101 |
| 2006/0021019 A1 | 1/2006 | Hinton et al. |
| 2007/0050339 A1 * | 3/2007 | Kasperski et al. ............. 707/3 |
| 2008/0104043 A1 * | 5/2008 | Garg et al. ..................... 707/4 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0144260 A1 * | 6/2009 | Bennett et al. ................ 707/5 |
| 2009/0177744 A1 | 7/2009 | Marlow et al. |
| 2010/0082604 A1 * | 4/2010 | Gutt et al. .................... 707/721 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0246406 A1 | 9/2013 | McFarlane et al. |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |

(56) References Cited

U.S. PATENT DOCUMENTS

2015/0095162 A1 4/2015 Jakobson et al.
2015/0142596 A1 5/2015 Jakobson et al.
2015/0172563 A1 6/2015 Jakobson et al.

OTHER PUBLICATIONS

Final Office Action from U.S. Appl. No. 13/874,420, dated Mar. 27, 2015.

* cited by examiner

Suggestion Score Calculator 400

| Factors → | Occurrences | Top | Average | Range | # of Words |
|---|---|---|---|---|---|
| Example Values | 4 | 85 | 75 | 20 | 3 |
| Maximums | 100 | 100 | 100 | 100 | 3 |
| Normalized Values | 0.04 | 0.85 | 0.75 | 0.8 | 1 |
| Weights | 0.1 | 0.2 | 0.3 | 0.3 | 0.1 |
| Weighted Values | 0.004 | 0.17 | 0.225 | 0.24 | 0.1 |
| Percentage of Score | 0.54 | 23.0 | 30.45 | 32.48 | 0.1 |

| Total Raw Score | Friendly Factor | Final Suggested Score |
|---|---|---|
| 0.739 | 100 | 73.9 |

FIG. 4

METHODS AND SYSTEMS FOR DYNAMICALLY SUGGESTING ANSWERS TO QUESTIONS SUBMITTED TO A PORTAL OF AN ONLINE SERVICE

CLAIM OF PRIORITY

This application is a continuation of U.S. patent application Ser. No. 13/111,195, filed May 19, 2011, entitled "METHODS AND SYSTEMS FOR DYNAMICALLY SUGGESTING ANSWERS TO QUESTIONS SUBMITTED TO A PORTAL OF AN ONLINE SERVICE," which claims the benefit of U.S. Provisional Patent Application 61/354,604, entitled "METHODS AND SYSTEMS FOR DYNAMICALLY SUGGESTING ANSWERS TO QUESTIONS SUBMITTED TO A PORTAL OF AN ONLINE SERVICE," by Patrick McFarlane et al., filed Jun. 14, 2010, and the entire contents of each of the above applications are incorporated herein by reference.

CROSS REFERENCE TO RELATED APPLICATIONS

The following commonly owned, co-pending or other United States Patents and Patent Applications, including the present application, are related to each other. Each of the other patents/applications listed below are incorporated by reference herein in its entirety:

U.S. Provisional Patent Application 61/354,604 entitled "METHODS AND SYSTEMS FOR DYNAMICALLY SUGGESTING ANSWERS TO QUESTIONS SUBMITTED TO A PORTAL OF AN ONLINE SERVICE," by Patrick McFarlane et al., filed Jun. 14, 2010, U.S. patent application Ser. No. 13/111,195 entitled, METHODS AND SYSTEMS FOR DYNAMICALLY SUGGESTING ANSWERS TO QUESTIONS SUBMITTED TO A PORTAL OF AN ONLINE SERVICE, by Patrick McFarlane et al., filed May 19, 2011, and U.S. patent application Ser. No. 13/874,420 entitled, METHODS AND SYSTEMS FOR DYNAMICALLY SUGGESTING ANSWERS TO QUESTIONS SUBMITTED TO A PORTAL OF AN ONLINE SERVICE, by Patrick McFarlane et al., filed Apr. 30, 2013.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to methods and systems for dynamically suggesting answers to questions submitted to a portal of an online service in an on-demand services environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional on-demand services, users may use a portal to access one or more services remotely over the Internet or through a local area network, without having to download software to their own user systems. A search feature often provided as part of the on-demand service may assist users in using the on-demand service. The search feature allows users to access a searchable database of help documents instructing users about various topics concerning the on-demand service. A user of such a conventional on-demand service typically submits search terms to the search feature and receives a list of help documents that may guide the user in resolving any issues or problems they may be experiencing with the on-demand service.

Unfortunately, conventional on-demand services do not provide search features that are as efficient as the search features could be.

Accordingly, it is desirable to provide techniques of improving service offerings accompanying searches of on-demand services.

BRIEF SUMMARY

In accordance with embodiments, there are provided mechanisms and methods for dynamically suggesting answers to questions submitted to a portal of an online service. These mechanisms and methods for dynamically suggesting answers to questions submitted to a portal of an online service can enable embodiments to provide help document suggestions with limited user input. The ability of embodiments to provide help document search term suggestions with limited user input can enable users to quickly and efficiently find useful help documents.

In an embodiment and by way of example, a method for dynamically suggesting answers to questions submitted to a portal of an online service is provided. In an embodiment, an online or on-demand service may include multi-tenant services, which may further include multi-tenant databases. In an embodiment, the method includes receiving user input, sending suggested search terms in response to the user input, receiving a user selection from the sent terms, calculating a score for the user selected term, updating the ranking of terms based on the calculated score, performing a search based on the selected search term, and sending the search results to a user system.

While one or more implementations and techniques are described with reference to an embodiment in which dynamically suggesting answers to a question submitted to a portal of an online service is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2®, by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 4 shows an example of an embodiment of a suggestion score calculator;

DETAILED DESCRIPTION

General Overview

Figure 1:
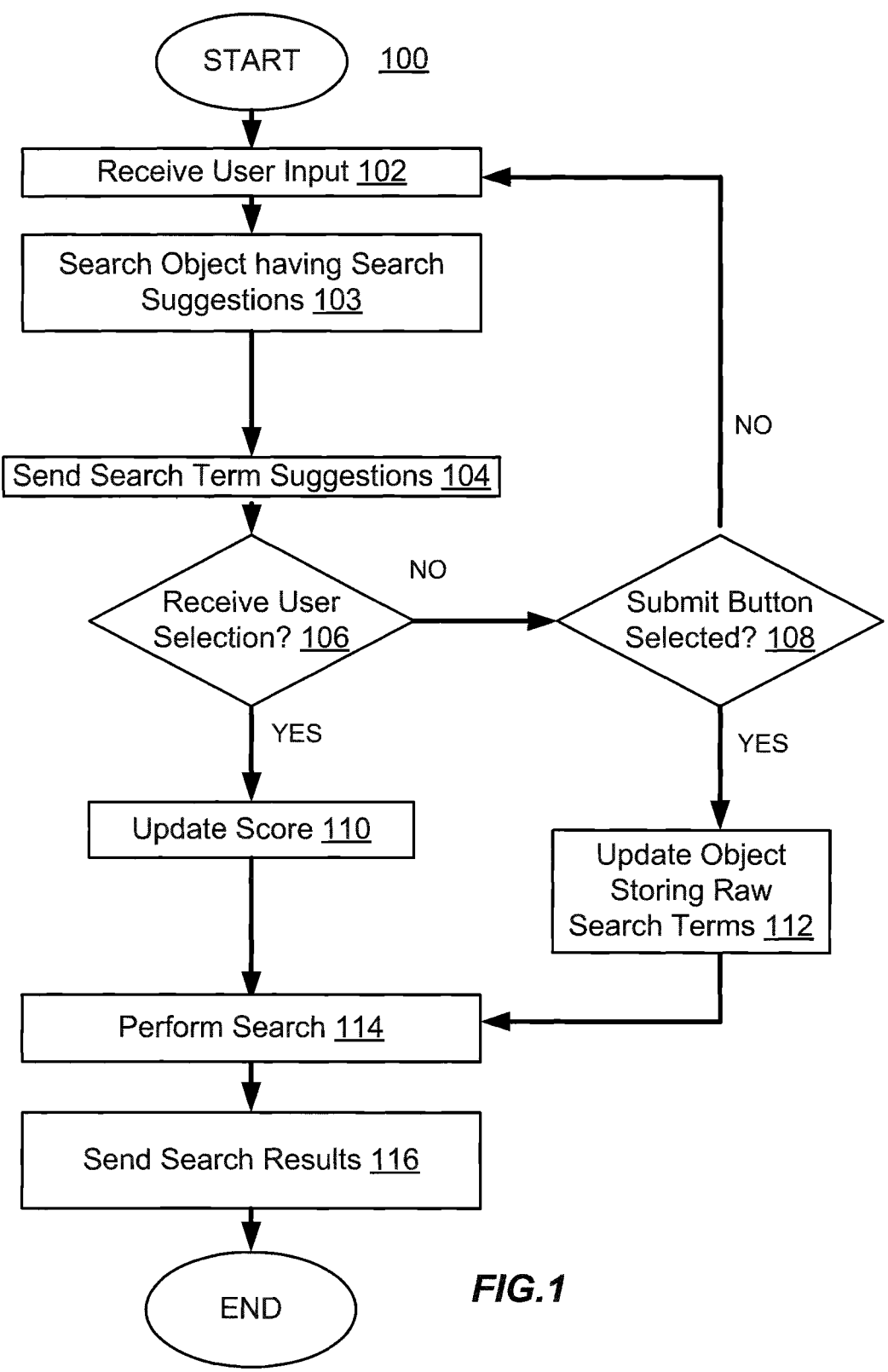
FIG. 1 shows an embodiment of a system-side method for providing dynamically suggested answers to questions submitted to a portal of an online service.

Systems and methods are provided for dynamically suggesting answers to questions submitted to an online service. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing dynamically suggested answers to questions submitted to an online service will be described with reference to example embodiments.

Dynamically Suggested Answers

Finding answers to questions and solving problems encountered while using an on-demand service can be an inefficient process. On-demand services often provide a search feature which may be used to find answers and solutions to problems encountered using the on-demand service.

The search feature may search for help documents created by the on-demand service provider to address frequently encountered questions and problems. Unfortunately, the provided search features are cumbersome and inefficient. For example, a user must fully input a search term, submit the search term, and then sift through the search results to determine if an applicable help document has been found. Additionally, the search features do not include a mechanism for receiving feedback about the quality of help documents from the community of on-demand service users. For example, the help documents returned by the search feature may not be relevant to the problem encountered by the user. While a document returned by the search feature may contain terms submitted by the user, the help document may be of little use to answering the question or solving the problem encountered by the user of the on-demand service.

Although search features exist in contexts other than on-demand services, the search features that exist might be inefficient if, for example, help document search term suggestions cannot be provided to the user. Although search features exist in contexts other than on-demand services, the search features might be inefficient if, for example, help document search term suggestions cannot be provided to the user. The inability to provide search term suggestions requires the user to fully enter and submit a question or search term, determine the question's or search term's relevancy, and then submit a new search if the search did not return useful results. Additionally, the search approaches do not account for which search terms other users of the on-demand service found useful in solving similar problems they encountered.

Providing a method of dynamically suggesting answers to questions submitted to an on-demand service may enable users to efficiently find help documents applicable to their question or problem. In an embodiment, based upon limited input from a user of the on-demand service, search terms are suggested to the user in relation to the limited user input. For example, a user may be faced with a login problem to the on-demand service. The user may choose to use the search term "login issues," and after a user of the on-demand service has input four characters, "l-o-g-i," a predetermined maximum number of search suggestions (e.g. ten search suggestions) containing "login," "logging out," and/or "logging in help" may be displayed to the user (if the system finds that many search suggestions to suggest). The user may then choose the search term that appears to most closely address his or her question or problem. Although throughout the specification the number or maximum number of search suggestion presented to the user is assumed to be ten, the number ten was chosen only as an example. In other embodiments, greater than ten or fewer than ten search terms may be suggested to the user. If none of the suggested search terms appear useful, the user may continue to enter input to refine the search terms displayed or fully input the search term and submit the complete search term. The ten or more search terms are given a suggestion scored based upon various factors. For example, the suggestion score may be based upon the number of occurrences of the user search term in the document, among various other factors. The highest ranked search terms based on the scores may be sent to the user in response to the limited input. In an embodiment, the selection of a suggested search term by the user of the on-demand service creates a feedback loop. By choosing a search term from the list of suggested search terms, a vote is automatically submitted for the selected search term as being the most useful of the ten suggested search terms, which may be used to rank a set of search suggestions in response to user input for another search. The vote (which was submitted automatically) may be submitted without the user's knowledge. The feedback loop may promote the most useful suggestions as defined by the on-demand service user community. In an embodiment, there are two custom objects. One custom object stores raw search terms, and additionally may store a count of how many times the search term has been entered by users, which is incremented every time the same raw search string is inputted as a search. Another custom object stores search suggestions, which are search strings that are suggested to users inputting a search. Once a raw search term has been inputted a certain number of times (more than a predetermined threshold), the raw search term may be moved to the second custom object and stored as a search suggestion.

FIG. 1 shows an embodiment of a system-side method 100 for providing dynamically suggested answers to questions submitted to a portal of an online service. The system-side method 100 may include the steps of receive input 102, search prior search terms 103, send suggestions 104, receive user selection 106, submit selected 108, calculate score 110, update scores 112, perform search 114, and send search results 116. In other embodiments, system-side method 100 may not have all the steps listed and/or may have other steps instead of or in addition to those listed.

A system-side method 100 may begin with receive input step 102 from a user system. In an embodiment, the input received from a user system may be as few as four characters or as many characters as necessary to input the user specified search term. For example, referring to the login problem previously described above, the input received may be the four characters "l-o-g-i." Alternatively, the input received may be as many characters as necessary to input, for example, "login problems forgot password." In other embodiments, fewer than four characters may be received. In step 103, a search of a stored set of prior search terms is performed. In send suggestions step 104, based on the user input received and the search result found, the on-demand service system may send search term suggestions relevant to the user input (e.g., the search suggestions found in the search may be sent). The sent suggestions may be, and/or may be based on, previously collected and/or summarized prior user searches and/or automated document analysis.

In an embodiment, ten search term suggestions having the highest suggestion score in relation to the user input are sent to the user system. In an embodiment, the ten search term suggestions may appear in a window immediately adjacent and/or below a text field of the search feature of the ondemand service. In an embodiment, the ten search term suggestions may be displayed in descending order, the search term having the highest suggestion score displayed immediately below the text field, so that it is easiest for the user to select the search selection with the highest ranking, and so that the ease of selecting the search suggestion increases with the ranking of the search suggestion. In other embodiments, the search terms may appear anywhere on the screen or in a new dialogue window and/or in any order. From the ten highest ranked search term suggestions, the user may select a search term that the user decides is relevant and useful to his or her problem and/or question. The user may scroll down through the suggestions and select a suggested search term by pressing 'Enter' or other designated selection key. In response to the selection of a suggested search term, the on-demand service system will copy the selected suggested search term into the search text field of the search feature of the on-demand service.

Search terms may be suggested by the on-demand service system to the user system based on a search term suggestion score. A score for the search term suggestion may be calculated by a number of a variety of factors. For example, a suggestion score factor may include the number of times the search term has been previously searched by other users. A suggestion score factor may also include the number of terms input by the user that match search terms of the suggested search. A suggestion score factor may also include a relevancy score that indicates the relevancy of the collection of documents found when a search is performed using the search term. Each document found by the search term may be assigned a relevancy score. Optionally, of the documents found, those documents having the highest relevancy are set aside in a group, and the number of documents in the group may be limited to a specified number. The score for the search term may be a combination of the relevancy score of the most relevant document, the average relevancy score of the group (or alternatively of all of the references found), and/or the range of relevancy scores in the group (or alternatively of all of the references found). The search suggestions stored may be stored with a score and/or the group of references found by the search term suggestion. The score stored with the search term suggestion may be the score that search term suggestions achieved the last time a search was conducted using the search terms of the search term suggestion and/or may be the score the group of articles that is saved in conjunction with the search term suggestion.

The relevancy score of each document may be combination of multiple factors. One factor in the relevancy of the document may be the number of different words of the search term present in that document—the more of the words of the search term in the document, the higher the score. Another factor in the relevancy of the document may be the total number of appearances of a word in from the search term or of the search terms in the document, where the more times the word or the search term appears the higher the score. Another factor in the relevancy of the document may be where a word from the search term, or where the search term, appears the document. If the word or search term appears in the title, the document may be given a higher weight than were the word or search term to appear in elsewhere in the document. Similarly, if the document has an abstract and the word appears in the abstract, the document may be given a higher weight than were the document to appear elsewhere in the document, but not as high of a weight as were the word or search term to appear in the title. Synonyms of the search terms, alternate spellings of the search terms, and/or acronym expansions may also be included in the count of whether and/or how many times a search word or term occurs, which may be given the same weight or a lower weight than the actual search word or term. Any combination of the above factors may be summed together in a weighted average (or may be combined in another formula) to form the relevancy score. The age of the document and/or the last time that document was viewed may also be used as a factor in determining the relevance of the document to the search term, and a weighted decaying function of time (e.g., a negative exponential function, such as exp $\{-(\text{a constant})(\text{time elapsed})\}$) may be added to the relevancy score and/or the entire relevancy score may be multiplied by the decaying function of time.

In an embodiment, the suggested search terms may also pass through filtering criteria before being sent to the user system. For example, the filtering criteria may include filters for obscene language and/or correct user type or privilege, among other things. In an embodiment, the suggested search terms may also be required to exceed minimum search thresholds. For example, the suggested search terms may be required to meet a minimum number of prior search occurrences. Unless the search terms that have been submitted by other users have been entered at least a minimum number of times, has at least a minimum relevancy, has at least a minimum rank, has at least a minimum number of votes, and/or has at least a minimum score, the search term may not show up as a search suggestion.

Once the highest ranking search terms are sent, in step 106, a determination is made whether the user has selected one of the suggested search terms. If the user has not made a selection from the suggested search terms, the method continues to step 108, and if the user selected one of the suggested search terms, the method continues to step 110. In step 108, a determination is made whether the user has selected the submit button of the search feature. If the user has not selected the submit button, additional input from the user may be forthcoming and method 100 returns the process to step 102 to receive additional input. If the user has selected the submit button, in step 110, a suggestion score is calculated for the user submitted search term.

In an embodiment, the search term is summarized and grouped together with prior similar searches and a suggestion score is calculated accounting for the additional search term submission occurrence. In an embodiment, the group of search terms may be assigned a score as if the group of search terms were just one search term. In an embodiment, only one of the search terms is selected from the group for the set of suggested search terms that is sent to the user. The ranking (within the suggested search results) of the search term chosen from the group may be determined by the score assigned to the group. In an embodiment, there may be a chosen search term that is always chosen from the group of search terms to represent the group. Alternatively, a score and/or ranking may be determined for each of the search terms in the group, and the search term with the highest score or ranking may be chosen to represent the group.

If no prior searches are similar to the submitted search term, then a new search term is created and added to the list of previously submitted search terms. Similarly, if the user in step 106 selects a suggested search term, a suggestion score is also calculated for the selected suggested search term accounting for the additional search term submission occurrence. In step 112, the summarized search term suggestion rankings are updated based on the additional submitted search term occurrence. In step 114, a search based on the submitted search term is performed. In step 116, the on-demand service system sends the search results based on the user submitted search term to the user system.

Figure 2:
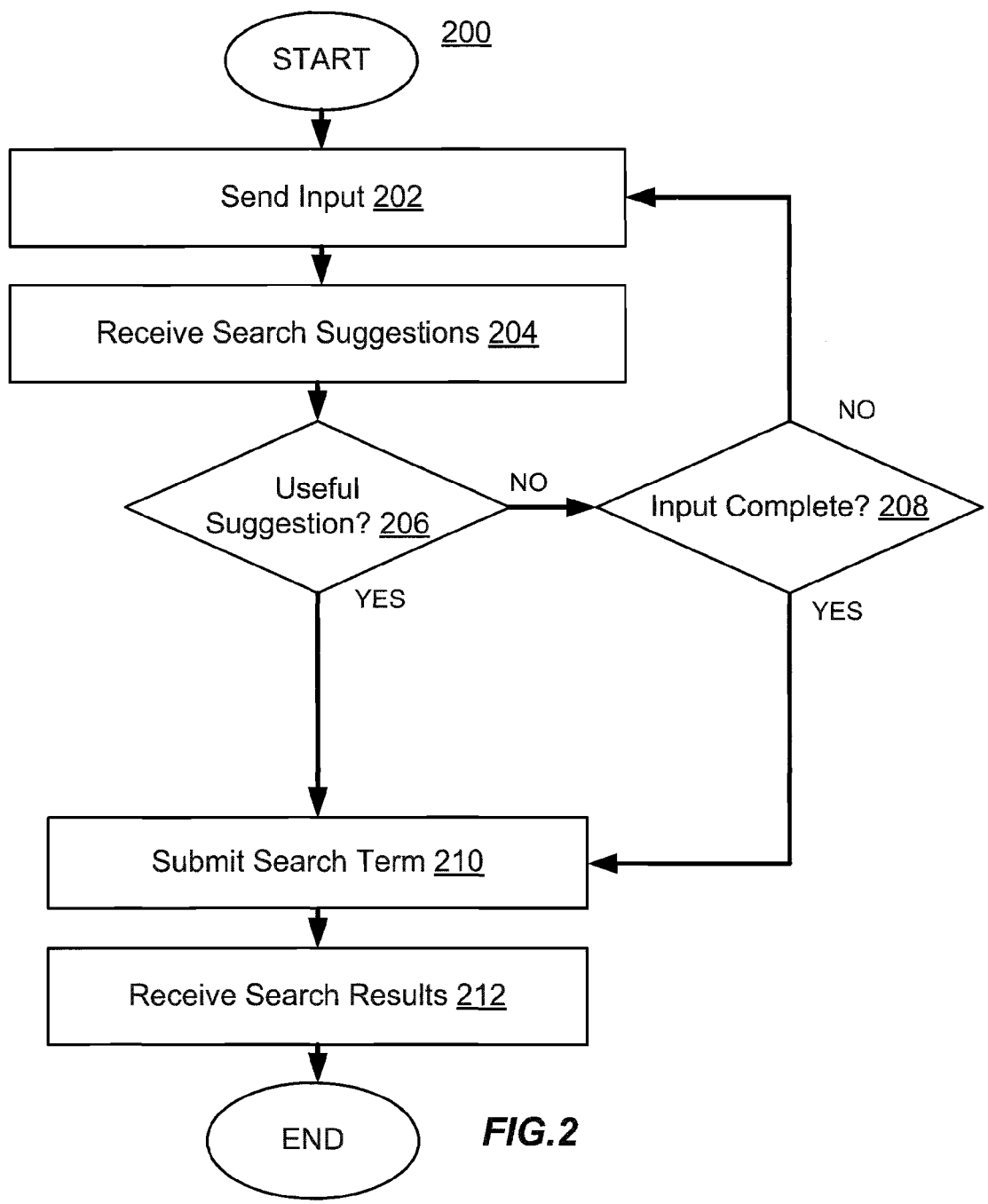
FIG. 2 shows an embodiment of a user-side method for providing dynamically suggested answers to questions submitted to a portal of an online service.

FIG. 2 shows an embodiment of a user-side method for providing dynamically suggested answers to questions submitted to a portal of an online service. The user-method 200 may include the steps of send input 202, receive suggestions 204, decide useful suggestions 206, input complete 208, submit search term 210, and receive selection 212. In other embodiments, user-side method 200 may not have all the steps listed and/or may have other steps instead of or in addition to those listed.

In step 202, the user may send input to the on-demand service system by inputting characters to a search feature of the on-demand service. The input may be a few characters of a word, or the input may be any number of complete words. In step 204, the user may receive search term suggestions based on the previously sent input. In step 206, the user may decide whether the list of suggested search terms received contains a search term that may be applicable to his or her problem or question. If there are no search term suggestions that are deemed applicable, in step 208 the user may either finish inputting the search term or submit the search term if the input is complete. If the user continues to input additional characters for the search term, the process returns to step 202. If the user has finished inputting the search term, or if in step 206 the user decides that a suggested search term is applicable to his or her problem or question, the search term may be submitted in step 210. In step 212, the user may receive the search results based on the submitted search terms.

Figure 3:
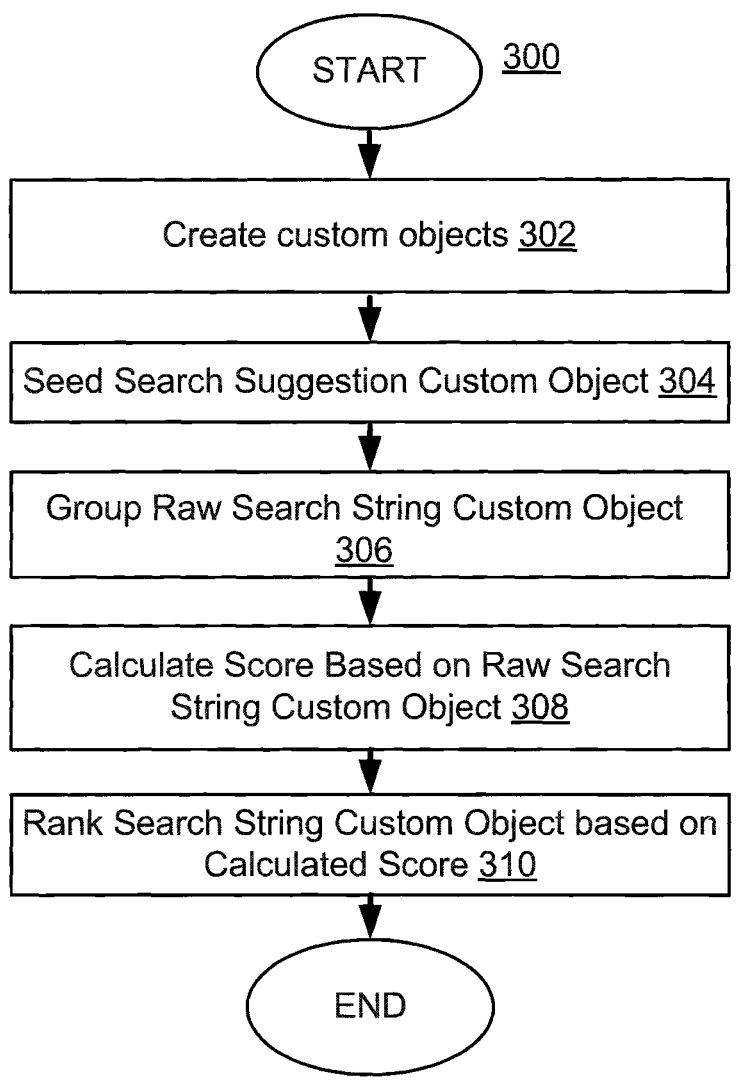
FIG. 3 shows an embodiment of a system-side method for creating a list of ranked search terms.

FIG. 3 shows an embodiment of a system-side method 300 for creating a list of ranked documents. The system-side method 300 may include create custom objects 302, seed search suggestion object 304, group raw search string 306, calculate score 308, and rank search string 310. In other embodiments, system-side method 300 may not have all the steps listed and/or may have other steps instead of or in addition to those listed.

Create custom objects 302 creates two custom objects for the on-demand service system to store various data. In an embodiment, one of the custom objects may be used to store raw search strings submitted by users of the on-demand service. In an embodiment, a second custom object may be used to store summarized and grouped search terms synthesized from the raw search strings. The summarized search terms in the second custom object may be quickly queried. In step 304, the second custom object used for storing summarized search terms may be seeded with a set of a few thousand auto-generated phrases based on help document titles and/or content. In step 306, raw search strings submitted by users are summarized and grouped. In an embodiment, search strings that share common search terms may be grouped together. In an embodiment, search strings may be summarized by removing grammatical particles and articles, and search strings that differ by only grammatical particles and/or articles are grouped together. In an embodiment, the raw search strings are grouped as the raw search strings are entered into the custom object for raw search terms. In another embodiment, once a raw search string has been entered enough times for the raw search string to be moved to the custom object for search suggestions, then the raw search string is grouped with other raw search strings and moved to the custom object for search term suggestions. In an embodiment, step 306 is performed automatically. In another embodiment, step 306 is performed manually. In step 308, a suggestion score is calculated for the summarized and grouped raw search strings using a number of factors. The factors that the suggestion score is based on may include the number of times the search term has been submitted, the top relevancy of the search results, the average relevancy of search results, the median relevancy of search results, the range of the relevancy of search results, the age of the search string (e.g., how long ago was the last time the search string was used) and the number of words of the search string, among other things. In step 310, based on the calculated suggestion score, the search string is ranked. As users vote for a suggestion (by submitting a search) the vote will be recorded and/or the score of the search string will be recalculated. As method 300 groups and scores the user submitted searches, the most meaningful and relevant search terms rise to the top of the suggested search term scores and rankings. Through the mechanism of incorporating user feedback (that is the using of the submission of a search term as a vote for that search term, which is used to calculate a score or ranking of the search term), the "crowd" or community of the on-demand service users may provide the most helpful search terms.

FIG. 4 shows an example of an embodiment of a suggestion score calculator 400. The suggestion score calculator may include input factors 402, occurrences 404, top relevancy 406, average relevancy 408, range of relevancy 410, number of words 412, example values 414, maximum values 416, normalized values 418, weights 420, weighted values 422, percentage of score 424, total raw score 426, user friendly factor 428, and final score 430. In other embodiments, suggestion score calculator 400 may not have all the elements listed and/or may have other elements instead of or in addition to those listed.

The suggestion score calculator may be used to calculate a suggestion score for search terms submitted by users. An on-demand portal search feature may suggest search terms to a user based on the calculated suggestion score of stored search terms. Although in FIG. 4, suggestion score calculator 400 is represented as a spreadsheet, in practice the system is programmed to automatically perform equivalent computations when a user submits a search to determine a ranking of the search term. A suggestion score may be calculated by a suggestion score calculator 400 based on various factors. Input factors 402 for the suggestion score calculator 400 lists the factors that may be used in calculating a suggestion score for a search term. Occurrences 404 may be a factor used in calculating a suggestion score. Occurrences 404 may represent the number of previous searches submitted by other users of the on-demand service having the same search terms. In FIG. 4, the example search term had been submitted on four prior occurrences.

Top relevancy 406 may be another factor used in calculating a suggestion score for a search term. As described previously, calculating a relevancy score may take into account the number of different search terms present in each help document, the frequency of search terms in each help document, the total number of appearances of search terms in a saved results set of help documents associated with that search term, where the search terms appear in the saved results set of help documents, synonyms of the search terms, alternate spellings of the search terms, acronym expansions, and/or a combination of some or all of the above factors, among other things. Top relevancy 406 may represent the highest relevancy score of the ten highest ranked help documents returned for a given search term.

Average relevancy 408 may be another factor used in calculating a suggestion score for a search term. Average relevancy 408 may represent the average of the ten highest ranked help documents returned for a given search term. Range of relevancy 410 may be another factor used in calculating a suggestion score for a search term. Range of relevancy may represent the difference between the highest relevancy score and lowest relevancy score of the ten highest ranked help documents returned for a given search term. Number of words 412 may be yet another factor used in calculating a suggestion score for a search term. Number of words 412 may represent the total number of words that make up the search term.

Example values 414 are representative values for the factors used in calculating a suggestion score for a search term. As described previously, four prior search occurrences 404 having the same search terms have been submitted before for the example search term in FIG. 4. The top relevancy 406 of help documents returned for the search term is eighty-five. The average relevancy 408 of help documents returned for the search term is seventy-five. The range of relevancy 410 between the top relevancy 406 and the lowest relevancy of the ten help documents is twenty. The number of words 412 of the example search term in FIG. 4 is three.

Maximum values 416 may represent the largest value that factors may have. In an embodiment, there is a cap (e.g., of 100) on the maximum values for occurrences 404, top relevancy 406, average relevancy 408, and range of relevancy 410. Capping the maximum values at one hundred may allow for a simplified normalization of the factors. In an embodiment, capping the maximum values may serve to prevent any one factor from overwhelming other factors. In an embodiment, the maximum value for number of words 412 may be capped at three. In alternative embodiments, the maximum value for number of words 412 may be greater or smaller than three.

Normalized values 418 may represent the factor values after having been processed to simplify the values for calculations and to simplify comparisons. The example values for occurrences 404, top relevancy 406, and average relevancy 408 have each been divided by one hundred to normalize the values. Thus, since the quantities occurrences 404, top relevancy 406, and average relevancy 408 have been capped at 100 and then the resulting value is divided by 100, the normalized values are numbers that are between 0 and 1. The range of relevancy 410 has also been divided by one hundred. However, after being divided by one-hundred, the range of relevancy 410 has also been subtracted from one (in other words, normalized_range_of_relevancy=1−max(raw_range_of_relevancy,100)/100), so that the normalized value of range of relevancy 410 is also a value between 0 and 1. In an embodiment, the subtraction from one in the normalization process for range of relevancy 410 may emphasize that a smaller the magnitude of the range of relevancy factor value is preferred over a large magnitude of the range of relevancy factor value. A smaller the magnitude of the range of relevancy factor value may suggest the help documents returned for a given search term may be of similar relevancy to a user.

Weights 420 may represent the weighting given to each of the factors affecting the calculated suggestion score for a given search term. The weighting may be adjusted and configured as necessary by an administrator of the on-demand service to provide search term suggestions that are useful to users of the on-demand service.

Weighted values 422 may represent the normalized values after adjusting for weights 420. The weighted values 422 may be arrived at by multiplying the normalized values 418 with the weights 420. For example, the normalized occurrence factor value of 0.04 multiplied by the weight for occurrences, 0.1, gives the weighted value for occurrences of 0.004. Similarly, the normalized top relevancy factor value of 0.85 multiplied by the weight for top relevancy, 0.2, gives the weighted value for top relevancy of 0.17.

Percentage of score 424 may represent the portion each suggestion score factor contributes to the final search term suggestion score for the given search term. The percentage of score 424 values may be calculated by dividing the weighted values 422 by the total raw score 426. For example, the weighted value for occurrences, 0.004, divided by the sum of the weighted values, 0.739, gives a percentage score of 0.54 percent. Similarly, the weighted average relevancy factor, 0.225, divided by the sum of the weighted values, 0.739, gives a percentage score of 30.45 percent. Total raw score 426 may represent the sum of all weighted values 422 of the factors making up the score used to determine the ranking of the search term suggestion. User friendly factor 428 is a factor used to make the final search term suggestion score a percentage. Final score 430 is the suggestion score value that may be used to rank the user submitted search term.

Figure 5:
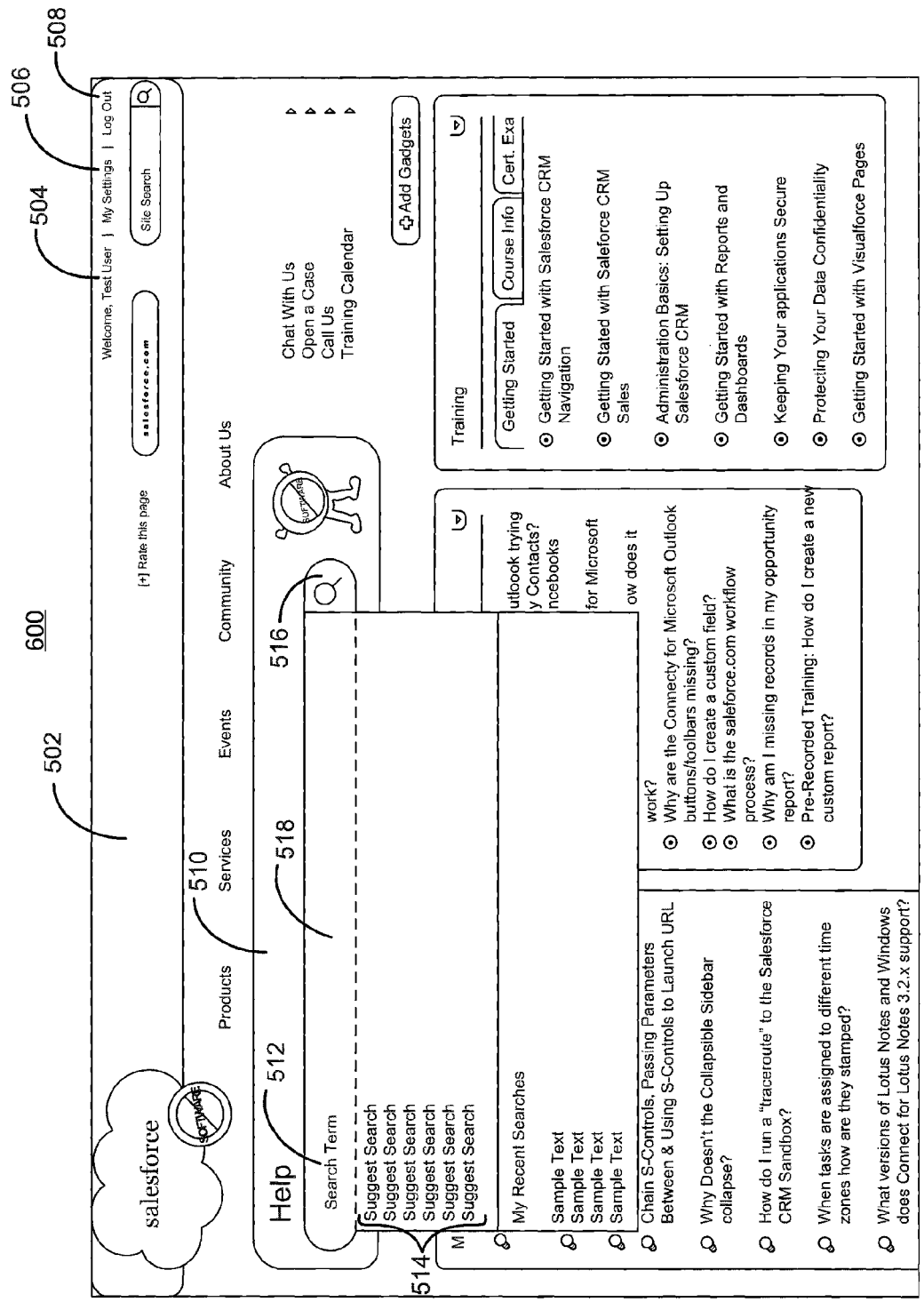
FIG. 5 is a screenshot of an embodiment of an on-demand service portal and search feature of the on-demand service.

FIG. 5 is a screenshot of an embodiment of an on-demand service portal and search feature of the on-demand service 500. An embodiment of an on-demand service portal and search feature of the on-demand service 500 may include on-demand service portal 502, user ID 504, user settings 506, log out 508, search feature 510, user inputted search term 512, suggested search terms 514, submit button 516, and search text field 518. In other embodiments, on demand service portal and search feature of the on-demand service 500 may not have all of the elements listed and/or may have other elements instead of or in addition to those listed.

On-demand service portal 502 may allow a user to login to an on-demand service system and access services the user has subscribed to or has sufficient privileges to access. In an embodiment, the on-demand service may provide services a la carte, allowing the user to pay for services as they go. User ID 504 may identify the user account the user has used to login to the on-demand service. User ID 504 may determine the privileges the user may have for using the on-demand service. User settings 506 may be a set of configurable parameters that the user may adjust to meet his or her preferences. For example, a user may adjust a parameter, such as whether or not to receive email notifications from administrators of the on-demand service. Logout 508 may be a link or button allowing the user to disconnect from the on-demand service.

Search feature 510 may be used by the user of the on-demand service to submit search terms to find help documents addressing problems and questions encountered by the user. User inputted search term 512 may be submitted to the on-demand service to find help documents relevant to the search terms. Suggested search terms 514 may be a list of search terms sent to the user in response to the user's input. Submit button 516 may be used to submit the user inputted search term to the on-demand service to find relevant help documents. The search text field 518 may allow a user to input characters and/or search terms he or she decides will most likely return a help document that will help answer the user's questions or help solve the user's problem.

Figure 6:
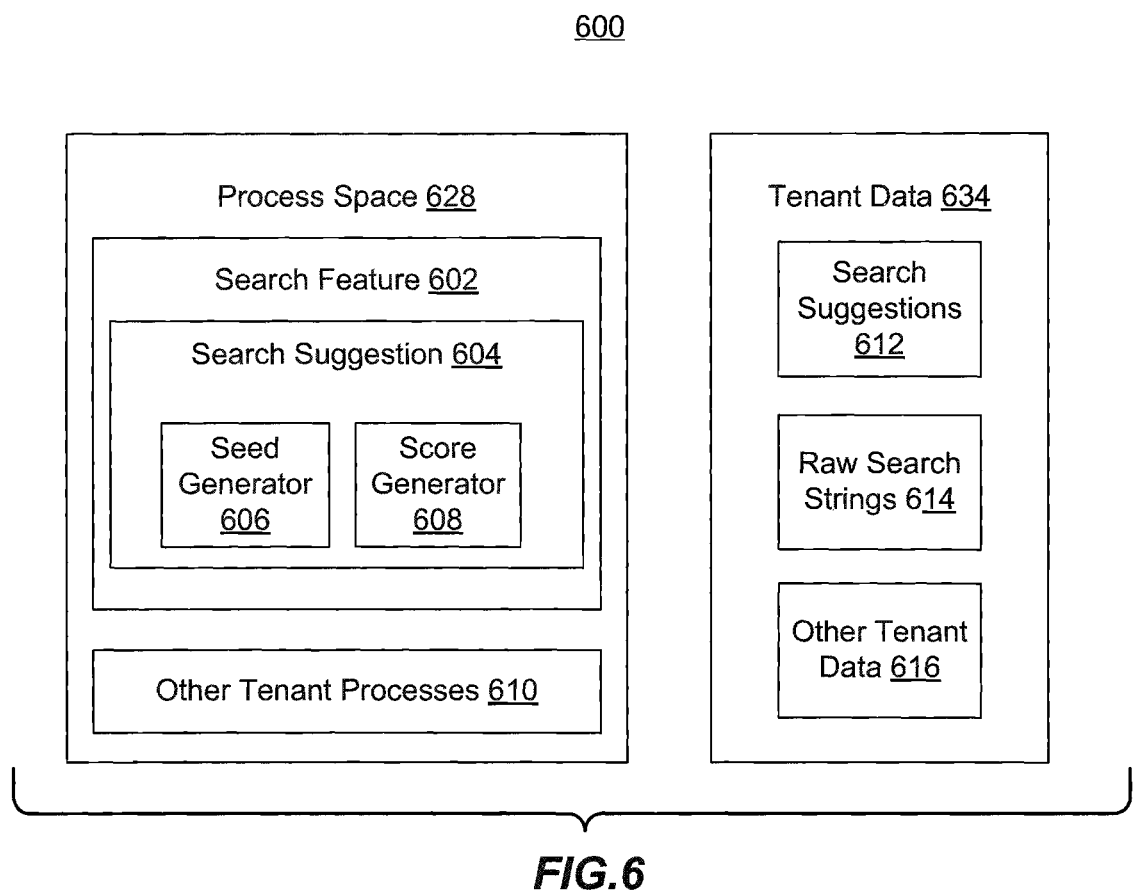
FIG. 6 shows a block diagram of an embodiment of a process space and tenant data for providing dynamically suggested answers to questions submitted to a portal of an online service.

FIG. 6 shows a block diagram of an embodiment of a process space 628 and tenant data 634 for providing dynamically suggested answers to questions submitted to a portal of an online service. In an embodiment, process space 628 may contain search feature 602, search suggestion 604, seed generator 606, score generator 608, and other tenant processes 610. In an embodiment, tenant data 634 may contain search suggestions 612, raw search strings 614, and other tenant data 616. In other embodiments, process space 628 and tenant data 634 may not have all of the elements listed and/or may have other elements instead of or in addition to those listed.

As described previously, search feature 602 may be part of an offering of an on-demand service. Search suggestion 604 may provide dynamically suggested answers to questions submitted to the search feature 602 of the on-demand service. Seed generator 606 may be used to initially seed a custom object used for storing search term suggestions. In an embodiment, the help documents are stored in associations with key words (e.g., in a relational database), and seed generator 606 may extract the keywords and/or keyword combinations associated with each document and store each keyword combination as a suggested search. In an embodiment, seed generator may also perform a search with each search suggestion generated and store the search results in association with the stored suggested search as search results of that suggested search. Score generator 608 may be used to calculate scores for user submitted search terms. Other tenant processes 610 may contain other processes of the on-demand service.

As described previously, a custom object may be used for storing raw search strings 614. Another custom object may be used for storing search suggestions 612. Optionally, occurrences 404, top relevancy 406, average relevancy 408, range of relevancy 410, number of words 412, and/or search results associated with the search suggestions are stored in association with the search suggestions. Other tenant data 616 may be used to store other tenant data of the on-demand service. Process space 628 and tenant data 634 may be part of a multi-tenant environment in which an on-demand service may exist. Tenant data 634 may be used to store custom objects of the search feature.

System Overview

Figure 7:
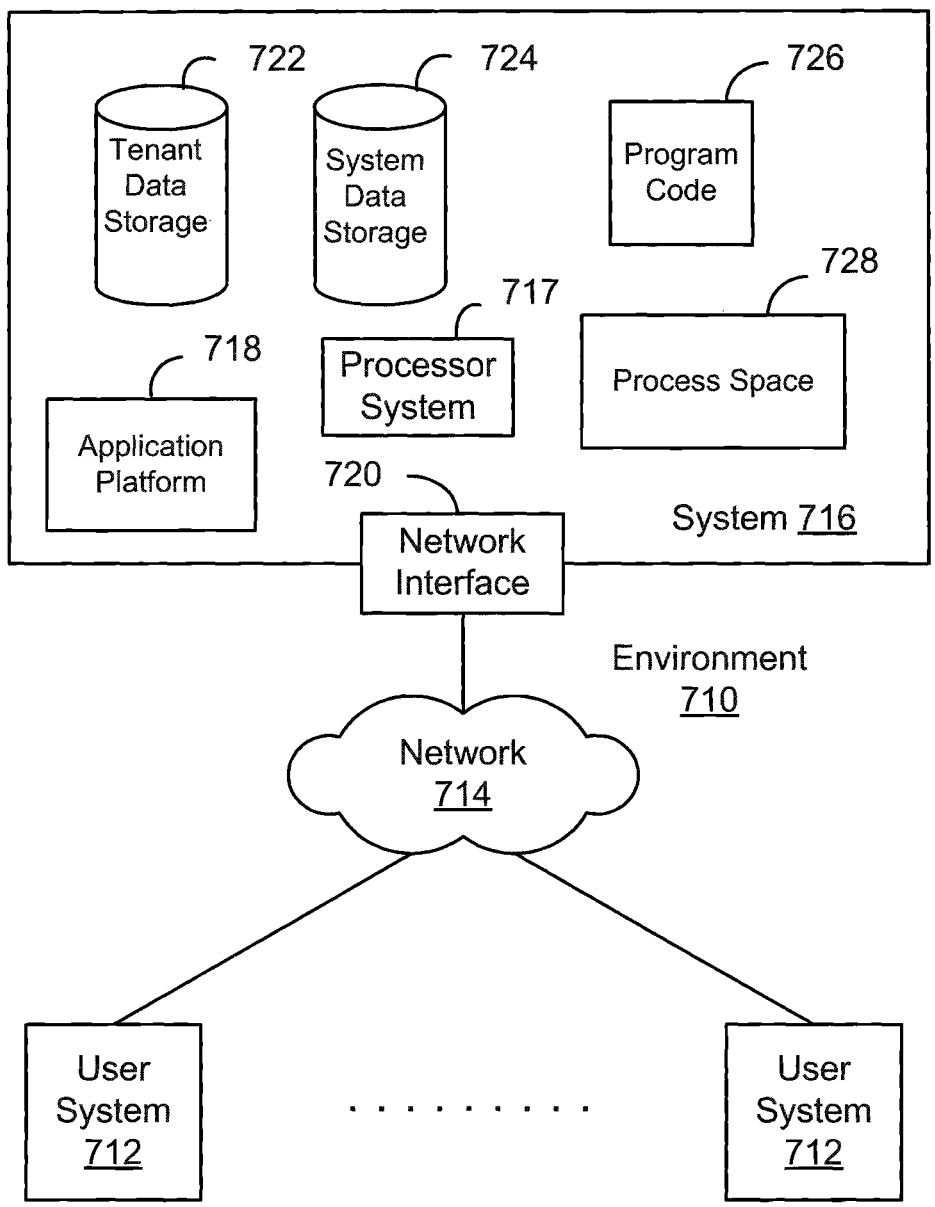
FIG. 7 illustrates a block diagram of an example of an environment wherein an on-demand database service might be used.

FIG. 7 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. User system 712 may belong to an individual, an organization, a company, or another entity that is a tenant of the multi-tenant database. The tenant of the multi-tenant database may have their own clients, associates, employees, officers, or other people associated with the tenant, which may be users of the multi-tenant database as a result of the tenant being a tenant of the multi-tenant database. For example, a tenant may provide a service to a client, and the tenant may rely on the multi-tenant database to provide another related service or the same service to the tenant, and the tenant may rely on the service provided by the multi-tenant database in order to provide that service or the related service to the client. For example, the multi-tenant database may provide access to a webpage (e.g., and ideas page) to the tenant, and the tenant may sell access to portions of the webpage or to related service to the client (e.g., so that the client may share ideas about the tenant's products). As illustrated in FIG. 7 (and in more detail in FIG. 8) user systems 712 might interact via a network 714 with an on-demand database service, which is system 716.

An on-demand database service, such as system 716, is a database system that is made available to outside users, as a service, that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include a CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for user storage 823, system data storage 724 for system data 825 accessible to system 716 and possibly multiple tenants, program code 726 for implementing various functions of system 716, and a process space 728 for executing MTS system processes and tenant-specific processes, such as running applications as part of an application hosting service (process space 628 may be an embodiment of process space 728). Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
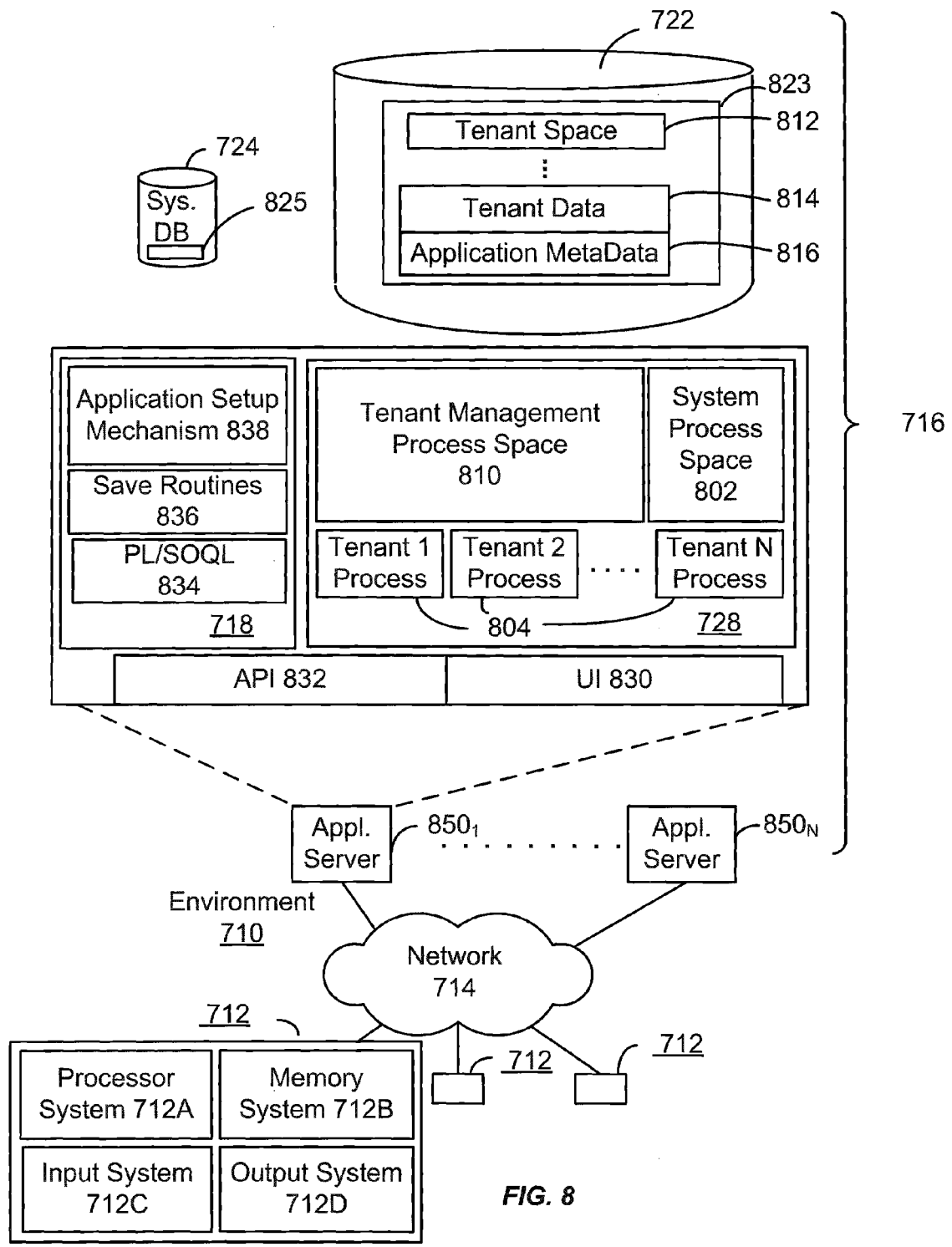
FIG. 8 illustrates a block diagram of an embodiment of elements of FIG. 7 and various possible interconnections between these elements.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, system data storage 724, system data 825, system process space 802, tenant process spaces 804, tenant management process space 810, tenant space 812, tenant data 814, application metadata 816, User Interface (UI) 830, Application Program Interface (API) 832, PL/SOQL 834, save routines 836, application setup mechanism 838, applications servers 8501-850N. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 850, an application platform 718, tenant data storage 722, and system data storage 724. Also shown is system process space 802, including individual tenant process spaces 804 and a tenant management process space 810. Each application server 850 may be configured to tenant data storage 722 and the user storage 823 therein, and system data storage 724 and the system data 825 therein to serve requests of user systems 712. The user storage 823 might be divided into individual tenant spaces 812, which can be either a physical arrangement and/or a logical arrangement of data. Within each tenant space 812, tenant data 814 and application metadata 816 might be similarly allocated for each user (tenant data 634 may be an embodiment of tenant data 814). For example, a copy of a user's most recently used (MRU) items might be stored to tenant data 814. Similarly, a copy of MRU items for an entire organization that is a tenant might be stored to tenant space 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned co-pending U.S. Provisional Patent Application 60/828,192 entitled, "Programming Language Method and System for Extending APIS to Execute in Conjunction with Database APIs," by Craig Weissman, filed Oct. 4, 2006, which is incorporated in its entirety herein for all purposes. Invocations to applications may be detected by one or more system processes, which manages retrieving application metadata 816 for the subscriber making the invocation and executing the metadata as an application in a virtual machine. Each application server 850 may be communicably coupled to database systems, e.g., having access to system data 725 and tenant data 814, via a different network connection. For example, one application server $850_1$ might be coupled via the network 714 (e.g., the Internet), another application server $850_{N-1}$ might be coupled via a direct network link, and another application server $850_N$ might be coupled by yet a different network connection. Transfer Control Protocol and Internet Protocol (TCP/IP) are typical protocols for communicating between application servers 850 and the database system. However, it will be apparent to one skilled in the art that other transport protocols may be used to optimize the system depending on the network interconnect used.

In certain embodiments, each application server 850 is configured to handle requests for any user associated with any organization that is a tenant. Because it is desirable to be able to add and remove application servers from the server pool at any time for any reason, there is preferably no server affinity for a user and/or organization to a specific application server 850. In one embodiment, therefore, an interface system implementing a load balancing function (e.g., an F5 Big-IP load balancer) is communicably coupled between the application servers 850 and the user systems 712 to distribute requests to the application servers 850. In one embodiment, the load balancer uses a least connections algorithm to route user requests to the application servers 850. Other examples of load balancing algorithms, such as round robin and observed response time, also can be used. For example, in certain embodiments, three consecutive requests from the same user could hit three different application servers 850, and three requests from different users could hit the same application server 850. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 850 to request and update system-level and tenant-level data from system 716 that may require sending one or more queries to tenant data storage 722 and/or system data storage 724. System 716 (e.g., an application server 850 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System," and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Method for Using the Environment (FIGS. 7 and 8)

Figure 9:
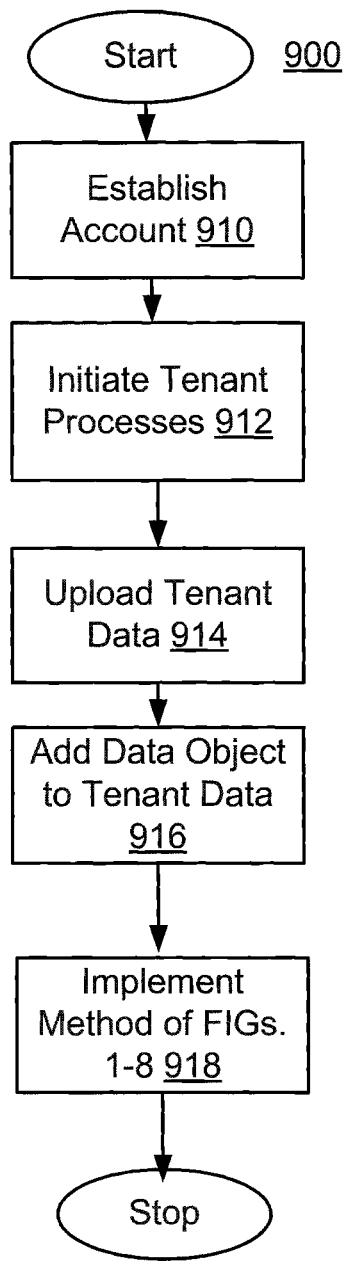
FIG. 9 is a flowchart of an example of a method of using the environment of FIGS. 7 and 8.

FIG. 9 shows a flowchart of an example of a method 900 of using environment 710. In step 910, user system 712 (FIGS. 7 and 8) establishes an account. In step 912, one or more tenant process space 804 (FIG. 8) are initiated on behalf of user system 712, which may also involve setting aside space in tenant space 812 (FIG. 8) and tenant data 814 (FIG. 8) for user system 712. Step 912 may also involve modifying application metadata to accommodate user system 712. In step 914, user system 712 uploads data. In step 916, one or more data objects are added to tenant data 814 where the data uploaded is stored. In step 918, the methods associated with FIGS. 1-8 may be implemented. For example, in step 918, methods for dynamically providing search suggestions to a user of an on-demand service in a multi-tenant database environment may be implemented. In another embodiment, although depicted as distinct steps in FIG. 9, steps 910-918 may not be distinct steps. In other embodiments, method 900 may not have all of the above steps and/or may have other steps in addition to, or instead of, those listed above. The steps of method 900 may be performed in another order. Subsets of the steps listed above as part of method 900 may be used to form their own method.

Method for Creating the Environment (FIGS. 7 and 8)

Figure 10:
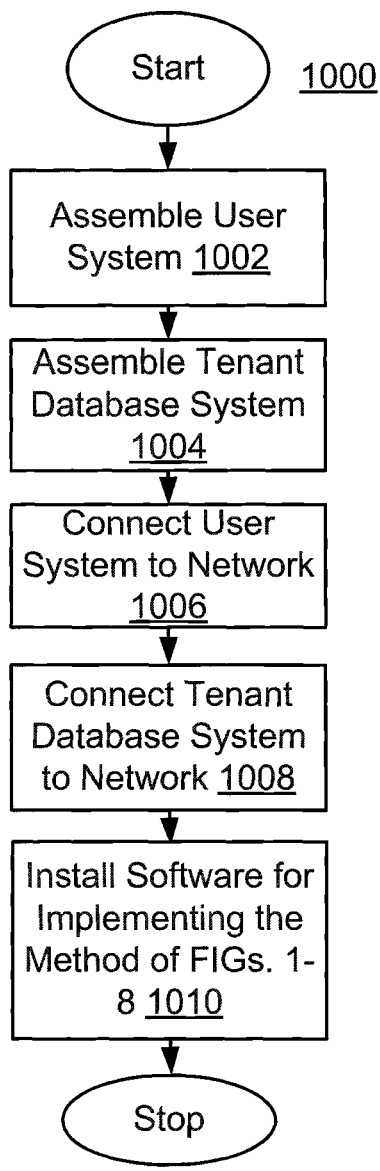
FIG. 10 is a flowchart of an example of a method of making the environment of FIGS. 7 and 8.

FIG. 10 is a method of making environment 710, in step 1002, user system 712 (FIGS. 7 and 8) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1004, system 716 (FIGS. 7 and 8) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 716 may include installing application platform 718, network interface 720, tenant data storage 722, system data storage 724, system data 825, program code 726, process space 728, UI 830, API 832, PL/SOQL 834, save routine 836, application setup mechanism 838, applications servers $850_1$-$100_N$, system process space 802, tenant process spaces 804, tenant management process space 810, tenant space 812, tenant data 814, and application metadata 816 (FIG. 8).

In step 1006, user system 712 is communicatively coupled to network 804. In step 1008, system 716 is communicatively coupled to network 714 allowing user system 712 and system 716 to communicate with one another (FIG. 8). In step 1010, one or more instructions may be installed in system 716 (e.g., the instructions may be installed on one or more machine readable media, such as computer readable media, therein) and/or system 716 is otherwise configured for performing the steps of methods associated with FIGS. 1-8. [For example, methods for dynamically providing search suggestions to a user of an on-demand service in a multi-tenant database environment may be installed in program space 726 of system 716.] In an embodiment, each of the steps of method 1000 is a distinct step. In another embodiment, although depicted as distinct steps in FIG. 10, steps 1002-1010 may not be distinct steps. In other embodiments, method 1000 may not have all of the above steps and/or may have other steps in addition to, or instead of, those listed above. The steps of method 1000 may be performed in another order. Subsets of the steps listed above as part of method 1000 may be used to form their own method.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method comprising:
    receiving, from a user system at a host system having a processor system including at least one processor and a memory system, user input for conducting a search, the user input including one or more input terms;
    automatically searching, by the processor system, a storage area in the memory system at the host system for stored search strings recorded from prior searches that are similar to the user input, the search strings each having one or more search terms;
    identifying a subset of the stored search strings that are similar to the user input, as a result of the searching;
    automatically determining, by the host system, a score for each of the search strings in the subset, the score being a value that indicates an expected likelihood that the user will be interested in the search string, wherein the score for each of the search strings is based on a plurality of factors including:
    a count of a number of the input terms in the user input that are the same as the one or more the search terms in the search string,
    a relevancy of a collection of documents found when a search is performed using the search string, and
    how often users have chosen the search string when suggested by the host system;
    ranking the search strings in the subset, in accordance with the determined scores; and
    sending, from the host system to the user system, the search strings in the subset, listed in order of the ranking as search suggestions.

2. The method of claim 1 further comprising:
    determining an identifier of the user from whom the user input was received;
    using the identifier of the user, determining search terms included in prior searches initiated by the user; and
    sending, from the host system to the user system, the determined search terms included in the prior searches initiated by the user, in addition to the search suggestions.

3. The method of claim 1, wherein the search suggestions that are sent are formatted such that search suggestions having a higher ranking are listed above than search suggestions having a lower ranking.

4. The method of claim 1, the host system including at least an on-demand multitenant database.

5. The method of claim 1, the search suggestions being presented to the user prior to the user inputting a full word.

6. A method comprising:
    receiving, at a host system, user input for conducting a search, the host system having a processor system including at least one processor and a memory system, the host system including at least an on-demand multi-tenant database;
    automatically searching, by the processor system, a storage area in the memory system at the host system for stored search terms from prior searches that are similar to the user input;
    automatically determining, the host system a ranking for the search terms found, the ranking being a value that indicates an expected likelihood that the user will be interested in the search term, which is based on how often users choose the search terms found;
    after receiving a predetermined number of characters of user input, sending, from the host system to the user system, the search terms found, listed in order of ranking as search suggestions completing the user input prior regardless of whether the user is finished entering the user input;
    determining, by the host, search terms searched in prior searches by the user from whom the user input was received;
    sending, from the host system to the user system, the search terms searched in the prior searches, in addition to the search suggestions completing the user input;
    after the automatically sending, receiving, at the host system, a search term for conducting a search;
    in response, at the host system, conducting, by the host, a search for documents having the search term, automatically incrementing, by the host, a value representing a number of votes for the search term of the search; and saving, by the host, the incremented value in association with the search term;

storing, by the host, in a first object for storing data, search suggestions in association with scores for ranking the search suggestions, the first object including groups of similar search terms grouped together as similar search terms;

storing, by the host, in a second object for storing data, raw search terms that were previously used for conducting a search, the raw search terms being stored in association with a value representing an indication as to how many times users entered each of the raw search terms, within the second object, raw search terms that are similar to one another being grouped together; storing, by the host, in association with the raw search terms, a value representing an indication as to how many times users entered each of the raw search terms;

storing, by the host, in association with a group of the raw search terms, a value representing an indication as to how many times users entered one of the group of raw search terms grouped together as similar to one another, the value stored in association with the group of the raw search terms being computed treating the group of raw search terms as a single raw search term;

determining, by the host, that the value stored in association with the group has crossed a threshold value; and in response, adding, by the host, the group of raw search terms to the first object;

determining, by the host, whether a magnitude of the value of the indication is greater than a threshold;

if the magnitude of the value of the indication is greater than the threshold, adding, by the host, the raw search term to the first object as a search suggestion; and storing, by the host, search results in association with the search suggestions of the first object.

7. A system comprising:

a host system having a processor system including at least one Processor, and a memory system, the memory system storing one or more machine instructions adapted to be executed by the processor system for:

receiving, from a user system, user input for conducting a search, the user input including one or more input terms;

automatically searching a storage area in the memory system at the host system for stored search strings recorded from prior searches that are similar to the user input, the search strings each having one or more search terms;

identifying a subset of the stored search strings that are similar to the user input, as a result of the searching;

automatically determining a score for each of the search strings in the subset, the score being a value that indicates an expected likelihood that the user will be interested in the search string, wherein the score for each of the search strings is based on a plurality of factors including:

a count of a number of the input terms in the user input that are the same as the one or more the search terms in the search string, a relevancy of a collection of documents found when a search is performed using the search string, and how often users have chosen the search string when suggested by the host system;

ranking the search strings in the subset, in accordance with the determined scores; and sending, to the user system, the search strings in the subset, listed in order of the ranking as search suggestions.

8. A computer program product embodied on a non-transitory computer readable medium, the computer program product including computer code adapted to be executed by a computer to perform a method comprising:

receiving, from a user system at a host system having a processor system including at least one processor and a memory system, user input for conducting a search, the user input including one or more input terms;

automatically searching, by the processor system, a storage area in the memory system at the host system for stored search strings recorded from prior searches that are similar to the user input, the search strings each having one or more search terms;

identifying a subset of the stored search strings that are similar to the user input, as a result of the searching;

automatically determining, by the host system, a score for each of the search strings in the subset, the score being a value that indicates an expected likelihood that the user will be interested in the search string, wherein the score for each of the search strings is based on a plurality of factors including:

a count of a number of the input terms in the user input that are the same as the one or more the search terms in the search string, a relevancy of a collection of documents found when a search is performed using the search string, and how often users have chosen the search string when suggested by the host system;

ranking the search strings in the subset, in accordance with the determined scores; and sending, from the host system to the user system, the search strings in the subset, listed in order of the ranking as search suggestions.

9. The computer program product of claim 8, wherein the plurality of factors further includes a count of a number of previous searches having the search string and submitted to the host system.

10. The computer program product of claim 8, wherein the relevancy of the collection of documents found when a search is performed using the search string is based on a highest relevancy score of a preconfigured number of the highest ranked documents found when the search is performed using the search string.

11. The computer program product of claim 8, wherein the relevancy of the collection of documents found when a search is performed using the search string is based on an average relevancy score of a preconfigured number of the highest ranked documents found when the search is performed using the search string.

12. The computer program product of claim 8, wherein the relevancy of the collection of documents found when a search is performed using the search string is based on a difference between a highest relevancy score and a lowest relevancy score of a preconfigured number of the highest ranked documents found when the search is performed using the search string.

13. The computer program product of claim 8, wherein the score for each search string is further based on a total number of words that make up the search string.

14. The computer program product of claim 8, wherein a maximum value is preconfigured for each of the factors to prevent any one factor from overwhelming other factors when determining the score for each of the search strings.

15. The computer program product of claim 8, wherein the score for each search string is further based on a normalization of values calculated for the factors.

16. The computer program product of claim 8, wherein a weight is preconfigured for each of the factors.

17. The computer program product of claim 16, wherein the score for each search string is further based on weighting values calculated for the factors in accordance with the respective preconfigured weights.

18. The computer program product of claim 8, wherein a percentage amount that each of the factors contributes to the score is preconfigured.

19. The computer program product of claim 8, wherein the score for each search string is further based on a sum of values determined for the factors.

20. The computer program product of claim 19, wherein the score is determined by applying an additional preconfigured factor to the sum, the additional preconfigured factor converting the sum to a percentage.

21. The computer program product of claim 8, wherein the memory system stores a first object having the search strings recorded from prior searches, and a second object storing grouped search strings synthesized from the search strings in the first object.

22. The computer program product of claim 21, wherein the search strings in the second object are grouped based on a commonality of search terms.

23. The computer program product of claim 21, wherein a search string in the first object is moved to the second object when the search string has been entered a threshold number of times.

24. The computer program product of claim 21, wherein the searching is performed within the second object.

25. The computer program product of claim 8, wherein the search strings recorded from prior searches include search strings previously entered by a plurality of users of the host system for performing searches.

26. The computer program product of claim 8, further comprising:
- identifying, by the host system, an identifier of the user from which the user input is received; and
- determining one of a plurality of storage areas in the memory system that is specific to the identifier of the user;
- wherein searching the storage area in the memory system at the host system for the one or more search strings includes searching the one of the plurality of storage areas determined to be specific to the identifier of the user for the one or more search strings.

* * * * *